(12) United States Patent
Chen

(10) Patent No.: US 8,583,828 B2
(45) Date of Patent: Nov. 12, 2013

(54) METHOD AND DEVICE FOR TRANSCODING

(75) Inventor: Jingchang Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/336,331

(22) Filed: Dec. 23, 2011

(65) Prior Publication Data

US 2012/0185610 A1   Jul. 19, 2012

Related U.S. Application Data

(63) Continuation of application No. PCT/CN2010/073723, filed on Jun. 9, 2010.

(30) Foreign Application Priority Data

Aug. 26, 2009   (CN) .......................... 2009 1 0168146

(51) Int. Cl.
*G06F 13/00* (2006.01)

(52) U.S. Cl.
USPC .............................. 709/246; 709/217; 709/250

(58) Field of Classification Search
USPC .......................... 709/246, 247, 250, 217, 230
See application file for complete search history.

(56) References Cited

U.S. PATENT DOCUMENTS 8,010,711 B2 * 8/2011 Amron et al. ..................... 710/8
2009/0003458 A1   1/2009 Au et al.

FOREIGN PATENT DOCUMENTS

| CN | 101068366 A | 11/2007 |
|----|-------------|---------|
| CN | 101098483 A | 1/2008  |
| CN | 101635854 A | 1/2010  |

OTHER PUBLICATIONS

English translation of a first office action that issued in corresponding Chinese Application No. 2009101681466 dated Jul. 14, 2010.

* cited by examiner

*Primary Examiner* — Viet Vu

(74) *Attorney, Agent, or Firm* — Marshall, Gerstein & Borun LLP

(57) ABSTRACT

Embodiments of the present invention provide a method and device for transcoding, which belongs to the computer media processing field. The method includes: receiving multiple multimedia source files selected by a user and a transcoding target parameter inputted by the user; separating each of the multiple multimedia source files into an audio stream and a video stream; according to the transcoding target parameter, transcoding each audio stream and each video stream obtained from the separation; merging transcoded audio streams and transcoded video streams of the multiple multimedia source files into at least one multimedia target file. The device includes: a receiving unit, a separating unit, a transcoding unit and a merging unit. The present invention extends transcoding modes, improves user experience, and has high practicability.

9 Claims, 7 Drawing Sheets

METHOD AND DEVICE FOR TRANSCODING

CROSS-REFERENCE TO RELATED APPLICATIONS

This is a continuation of International Patent Application No. PCT/CN2010/073723 filed Jun. 9, 2010, which in turn claims the priority benefit of Chinese Patent Application No. CN 200910168146.6 filed Aug. 26, 2009, the entire respective disclosures of which are incorporated herein by reference.

FIELD OF THE INVENTION

The present invention relates to computer multimedia processing field, and more particularly, to a method and device for transcoding.

BACKGROUND OF THE INVENTION

With the rapid development of information, multimedia technology has become an indispensable and important part of people's work and study. In order to prompt further development of multimedia technology, and satisfy different demands for multimedia services during people's daily life, some organization for standardization provide multiple audio/video coding standards for different service demands. Such as H.263 standard provided for video phone and video conference in multimedia technology, Moving Picture Expert Group (MPEG2) standard provided for Digital Video Broadcasting (DVB), High Definition Television (HDTV) and Digital Versatile Disc (DVD) in multimedia technology, MPEG4 standard provided for network streaming media service in multimedia technology, H.264 standard capable of providing better performances in compression and being friendly, and so on. Since multiple coding standards exist simultaneously, and the demands for compression efficiency, decompression speed, and target device used by code stream are different, there are various multimedia files with different file formats, video formats and compression formats. To utilize existing multimedia resources effectively and implement the conversion of files of different standards, the transcoding technology has attracted much attention. More and more research and development are performed on the transcoding technology ceaselessly.

In the prior art, a software or hardware tool providing conversion between different standards is called a transcoder. For a multimedia file, the existing transcoder only provide a one-to-one transcoding function, that is, one source file is transcoded into one target file.

When implementing the present invention, at least the following disadvantages and deficiencies in the prior art are found by the inventor.

Since the existing transcoder can only provide a one-to-one trascoding function, namely, one source file is transcoded into one target file, transcoding method is unitary, and transcoding efficiency is not high. When there are multiple source files to be transcoded, it is required for the user to start up the transcoder many times for performing transcoding operations, which impairs the user experience. Especially when the source files are relative small, the multimedia files transcoded by the transcoder can only be played one by one, the user's need of continuously playing multiple multimedia files can not be satisfied.

SUMMARY OF THE INVENTION

When there are multimedia source files to be transcoded, in order to decrease transcoding times, improve user experience, raise transcoding efficiency, and meet the user's need of continuously playing multiple multimedia files, embodiments of the present invention provide a method and device for transcoding, the technical solution is as follows.

On one hand, a method for transcoding is provided by embodiments of the present invention, the method includes:

receiving multiple multimedia source files selected by a user and a transcoding target parameter inputted by the user;

separating each of the multiple multimedia source files into an audio stream and a video stream;

according to the transcoding target parameter, transcoding each audio stream and each video stream both of which are obtained from the separation;

merging transcoded audio streams and transcoded video streams of the multiple multimedia source files into at least one multimedia target file.

On the other hand, a device for transcoding is provided by embodiments of the present invention, the device includes:

a receiving unit, to receive multiple multimedia source files selected by a user and a transcoding target parameter inputted by the user;

a separating unit, to separate each of the multiple multimedia source files into an audio stream and a video stream;

a transcoding unit, to transcode each audio stream and each video stream separated by the separating unit according to the transcoding target parameter received by the receiving unit; and a merging unit, to merge transcoded audio streams and transcoded video streams of the multiple multimedia source files obtained by the transcoding unit into at least one multimedia target file.

The advantages achieved by the technical solution provided by embodiments of the present invention are as follows.

Each of multiple source files to be transcoded selected by a user is separated into an audio stream and a video stream, and each audio stream and each video stream obtained from the separation is transcoded according to a transcoding target parameter inputted by the user. Thus, the transcoding operations on multiple source files may be performed at one time after the user selects the multiple multimedia source files, the transcoding operation is not needed to be started multiple times, transcoding times are decreased, and then the user experience may be improved. In addition, when merging transcoded audio stream and transcoded video stream, the transcoded audio stream and transcoded video stream may be merged into one multimedia target file, thus the user's need of continuously playing multiple multimedia files is satisfied, and the user experience may be further improved. Furthermore, by performing audio/video stream separation and transcoding on multiple source files to be transcoded simultaneously, the transcoding efficiency may be further increased.

BRIEF DESCRIPTION OF DRAWINGS

To clearer describe the technical solution in the embodiments of the present invention, accompanying drawings for describing the embodiments will be described in brief hereinafter. Obviously, the following accompanying drawings are merely some examples of the present invention. Other drawings may be obtained according to these accompanying drawings without creative work by those skilled in the art.

DETAILED DESCRIPTION OF THE INVENTION

In order to make objectives, technical solutions and advantages of the present invention clearer, embodiments of the present invention will be described in detail hereinafter with reference to accompanying drawings.

The First Embodiment

Figure 1:
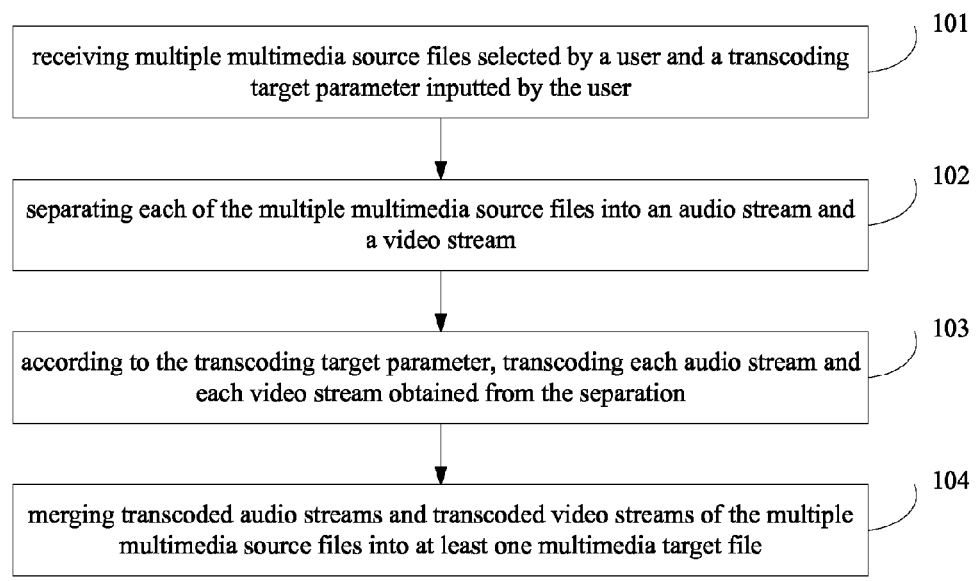
FIG. 1 is a flowchart illustrating a transcoding method in accordance with the first embodiment of the present invention.

When there are multimedia source files to be transcoded, in order to decrease transcoding times, improve user experience, the embodiment of the present invention provide a transcoding method, as shown in FIG. 1, the method includes the following processes.

101: receiving multiple multimedia source files selected by a user and a transcoding target parameter inputted by the user.

102: separating each of the multiple multimedia source files into an audio stream and a video stream.

103: according to the transcoding target parameter, transcoding each audio stream and each video stream obtained from the separation.

104: merging transcoded audio streams and transcoded video streams of the multiple multimedia source files into at least one multimedia target file.

In the method provided by the embodiment of the present invention, each of the multiple source files to be transcoded selected by a user is separated into an audio stream and a video stream, and each audio stream and each video stream obtained from the separation is transcoded according to a transcoding target parameter inputted by the user. Thus, the transcoding operations on multiple source files may be performed at one time after the user selects the multiple multimedia source files, the transcoding operation is not needed to be started multiple times, transcoding times are decreased, and then the user experience may be enhanced.

The method provide by above-mentioned embodiment will be described in detail in accordance with the following embodiments.

The Second Embodiment

Figure 2:
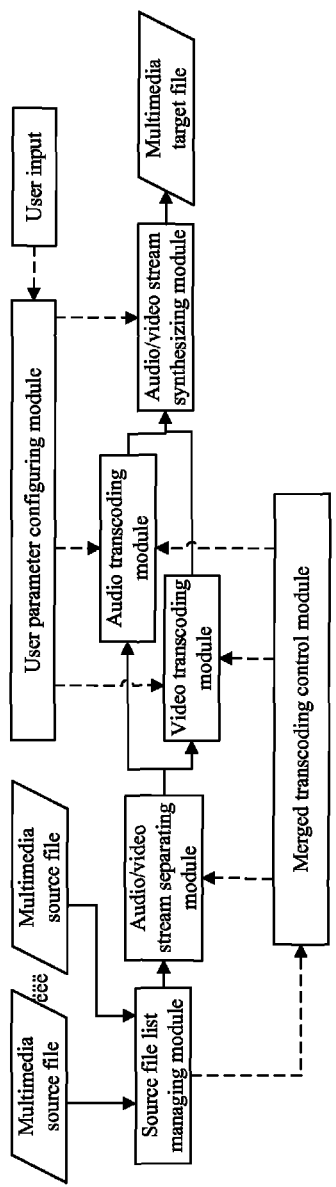
FIG. 2 is a schematic diagram illustrating a structure of a transcoder in accordance with the second embodiment of the present invention.
Figure 3:
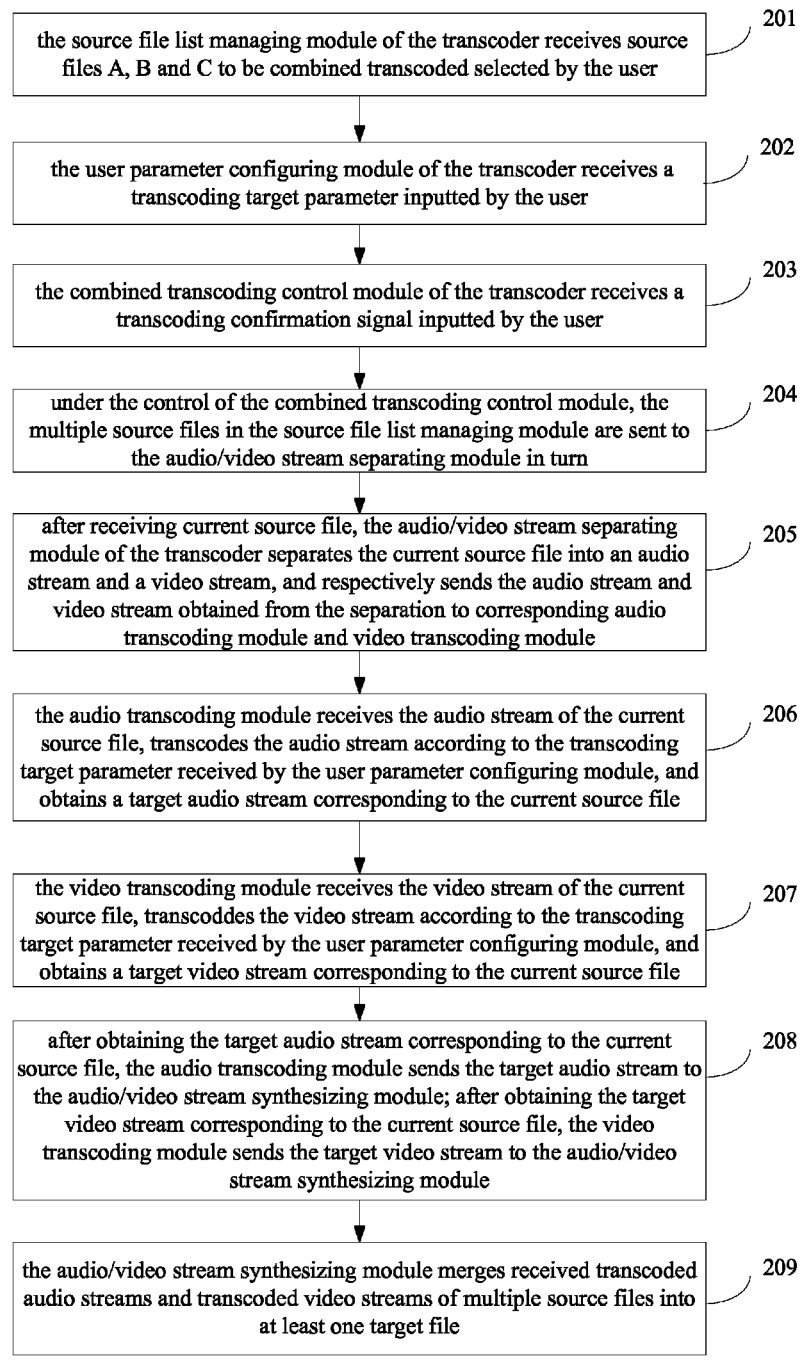
FIG. 3 is a flowchart illustrating a transcoding method implemented based on the schematic diagram shown in FIG. 2 in accordance with the second embodiment of the present invention.

When there are multimedia source files to be transcoded, in order to decrease transcoding times, improve user experience, the embodiment of the present invention provide a transcoding method, based on the method provided by the second embodiment, FIG. 2 is a schematic diagram illustrating a structure of a transcoder for implementing the method provided by the second embodiment of the present invention. The transcoder includes: a source file list managing module, an audio/video stream separating module, an audio transcoding module, a video transcoding module, an audio/video stream synthesizing module, a merged transcoding control module and a user parameter configuring module. Based on the structure of the transcoder, in order to make a schematic description of the method provided by the embodiment of the present invention, suppose there are multiple source files to be merged transcoded, of which filenames are respectively A, B and C. For details, refer to FIG. 3, the method includes the following processes.

201: the source file list managing module of the transcoder receives source files A, B and C to be merged transcoded selected by the user.

The number and types of the source files are not limited by the embodiment of the present invention. Refer to table 1, which is a schematic table for illustrating information of source files provided by the embodiment of the present invention.

TABLE 1

| Filename | Creation time of file | File format | Playing duration of file | File size | ... |
|---|---|---|---|---|---|
| A | 2009.7.1 | MPEG4 | 00:02:00 | 6M | ... |
| B | 2009.7.2 | AVI | 00:01:15 | 7M | ... |
| C | 2009.7.3 | MPEG4 | 00:03:10 | 16M | ... |
| ... | ... | ... | ... | ... | ... |

Furthermore, after one or more source files to be merged transcoded are added in the source file list managing module by the user, according to needs of the user, operations, such as cancel and reorder, may be performed on source files in the source file list.

202: the user parameter configuring module of the transcoder receives a transcoding target parameter inputted by the user.

The transcoding target parameter includes but is not limited to a file format of a multimedia target file, a file size of the multimedia target file, code stream of the multimedia target file, and so on. To facilitate description, suppose the transcoding target parameter inputted by the user includes a file format of a multimedia target file and a file size of the multimedia target file. For instance, in the transcoding target parameter inputted by the user, the file format of the multimedia target file is Audio Video Interleaved (AVI), and the file size of the multimedia target file is 15 M.

Preferable, after receiving the transcoding target parameter inputted by the user, the user parameter configuring module provided by the embodiment of the present invention may also determine whether the transcoding target parameter is valid, if the transcoding target parameter is valid, forwards the transcoding target parameter inputted by the user to the audio transcoding module, the video transcoding module and the audio/video stream synthesizing module; otherwise, prompts the user of inputting a transcoding target parameter again. The method for determining whether the transcoding target parameter is valid is not limited by the embodiment. For example, it is possible to preset a format parameter, and determine whether received transcoding target parameter is the format parameter, if the transcoding target parameter is the format parameter, the transcoding target parameter is considered to be valid; otherwise, the transcoding target parameter is invalid. The preset format parameter is not limited by the embodiment.

203: the merged transcoding control module of the transcoder receives a transcoding confirmation signal inputted by the user.

After inputting selected source files to be transcoded as well as a transcoding target parameter in the transcoder, the user may initiate a transcoding confirmation signal to start the transcoding. For instance, the user may initiate the transcoding confirmation signal to start the transcoding by pressing a confirmation button provided in advance, so as to perform the merged transcoding function.

204: under the control of the merged transcoding control module, the multiple source files in the source file list managing module are sent to the audio/video stream separating module in turn.

How to send the multiple source files in the source file list managing module to the audio/video stream separating module in turn is not limited by the embodiment. For example, the merged transcoding control module may send source files A, B and C to the audio/video stream separating module in turn in an order of creation time of the source files. Or, the merged transcoding control module may send source files A, B and C to the audio/video stream separating module in turn in an order of filenames of the source files, or according to an arrangement sequence of transcoded files.

With above-mentioned methods for sending the source files in the source file list managing module to the audio/video stream separating module in turn, the audio/video stream separating module may perform audio/video stream separation on each source file in turn according to the receiving sequence. Alternatively, the audio/video stream separating module may perform audio/video stream separation on all source files simultaneously after receiving all source files. The embodiment does not limit the specific separation method.

205: after receiving current source file, the audio/video stream separating module of the transcoder separates the current source file into an audio stream and a video stream, and respectively sends the audio stream and video stream obtained from the separation to corresponding audio transcoding module and video transcoding module.

For instance, after receiving current source file A, the audio/video stream separating module of the transcoder performs audio/video file analysis on the current source file A, obtains an audio stream of the current source file A and a video stream of the current source file A, and sends the audio stream of the current source file A to the audio transcoding module, sends the video stream of the current source file A to the video transcoding module, so that the audio stream and video stream may be respectively transcoded.

After the audio/video stream separating module of the transcoder respectively sends the audio stream and video stream obtained from the separation to corresponding audio transcoding module and video transcoding module, similar to the audio/video stream separating module, the audio transcoding module may also transcode each audio stream in turn or transcode all audio streams simultaneously, and video transcoding module may also transcode each video stream in turn or transcode all video streams simultaneously. The embodiment does not limit the specific transcoding method.

206: the audio transcoding module receives the audio stream of the current source file, transcodes the audio stream according to the transcoding target parameter received by the user parameter configuring module, and obtains a target audio stream corresponding to the current source file.

As mentioned above, in an example, the transcoding target parameter inputted by the user includes a file format AVI of a target file. Because the file format of the source file A is MPEG4, after receiving the audio stream of the source file A, the audio transcoding module transcodes the audio stream of the source file A according to the file format AVI of the target file. Therefore, the audio stream is transcoded to a target audio stream in user-desired audio format.

207: the video transcoding module receives the video stream of the current source file, transcodes the video stream according to the transcoding target parameter received by the user parameter configuring module, and obtains a target video stream corresponding to the current source file.

Similar to block 206, the video transcoding module is configured to transcode the video stream to target video stream in user-desired video format. In the example, the transcoding target parameter inputted by the user includes a file format AVI of a target file. Because the file format of the source file A is MPEG4, after receiving the video stream of the source file A, the video transcoding module transcodes the video stream of the source file A according to the file format AVI of the target file. Therefore, the video stream is transcoded to target video stream in user-desired video format.

The performing sequence of block 206 and block 207 is not limited by the embodiment of the present invention.

208: after obtaining the target audio stream corresponding to the current source file, the audio transcoding module sends the target audio stream to the audio/video stream synthesizing module; after obtaining the target video stream corresponding to the current source file, the video transcoding module sends the target video stream to the audio/video stream synthesizing module.

209: the audio/video stream synthesizing module merges received transcoded audio streams and transcoded video streams of multiple source files into at least one target file.

There may be the following two scenes regarding block 209.

When merging transcoded audio streams and transcoded video streams of multiple source files into multiple multimedia target files, it is possible to merge the transcoded audio stream and transcoded video stream of each multimedia source file, and obtain a multimedia target file corresponding to the multimedia source file.

When merging transcoded audio streams and transcoded video streams of multiple source files into one multimedia target file, there may be the following two implementing modes, which are not limited here.

The First Mode

Merging transcoded audio streams of all multimedia source files, and obtaining a merged audio stream;

Merging transcoded video streams of all multimedia source files, and obtaining a merged video stream;

Merging the merged audio stream and the merged video stream, and obtaining one multimedia target file.

The Second Mode

After merging the transcoded audio streams and transcoded video streams of multiple source files into multiple multimedia target files, merging the multiple multimedia target files into one multimedia target file. That is to say, after obtaining the multimedia target files corresponding to the multimedia source files under the first scene, merging obtained multimedia target files corresponding to the multimedia source files, and obtaining one multimedia target file.

For instance, refer to table 2, which is a schematic table for illustrating audio streams and video streams obtained after separation, transcoded audio streams and transcoded video streams of source files provided by the embodiment of the present invention.

TABLE 2

| Name of source file | Audio stream of source file | Video stream of source file | Audio stream of target file | Video stream of target file |
|---|---|---|---|---|
| A | Ax | Ay | Axx | Ayy |
| B | Bx | By | Bxx | Byy |
| C | Cx | Cy | Cxx | Cyy |
| ... | ... | ... | ... | ... |

As shown in table 2, when the audio/video stream synthesizing module merges obtained audio streams of target files and video streams of target files, the following modes may be adopted.

1. Transcoded audio streams and transcoded video streams of multiple multimedia source files are merged into multiple multimedia target files.

After the audio stream Axx and video stream Ayy of the target file corresponding to the source file A are merged, a target file A' is obtained; after the audio stream Bxx and video stream Byy of the target file corresponding to the source file B are merged, a target file B' is obtained; after the audio stream Cxx and video stream Cyy of the target file corresponding to the source file C are merged, a target file C' is obtained.

2. Transcoded audio streams and transcoded video streams of multiple multimedia source files are merged into one multimedia target file.

1) On the basis of the first mode, the target files A', B' and C' are merged, and a target file (suppose the target file is M') is obtained.

2) The audio streams of target files corresponding to the source file A, source file B and source file C are merged, and then a merged audio stream is obtained; the video streams of target files corresponding to the source file A, source file B and source file C are merged, and then a merged video stream is obtained. The merged audio stream and merged video stream are merged, and then a target file (suppose the target file is N') is obtained. Namely, Axx, Bxx and Cxx are merged, and then Nxx is obtained; Ayy, Byy and Cyy are merged, and then Nyy is obtained. Nxx and Nyy are merged, and then N' is obtained.

According to actual conditions, the target files M' and N' in above example may be the same or different. The specific merging mode is not limited by the embodiment. In order to achieve a better synchronization between the audio and the video, the mode for merging the audio stream and video stream of each multimedia source file may be preferably selected. The separation of audio/video stream and the transcoding of audio/video stream are existing techniques, no further descriptions will be provided here.

With above-mentioned blocks 201-209, after the user selects source files to be transcoded, the source files are added into a source file list in a customized order. When files in the source file list are transcoded into one target file by utilizing the method provided by the embodiment of the present invention, especially when the source files are relative small, a target file with a long playing time may be obtained by merged transcoding. Thus, the user experience is improved, and transcoding modes are enriched.

Figure 4:
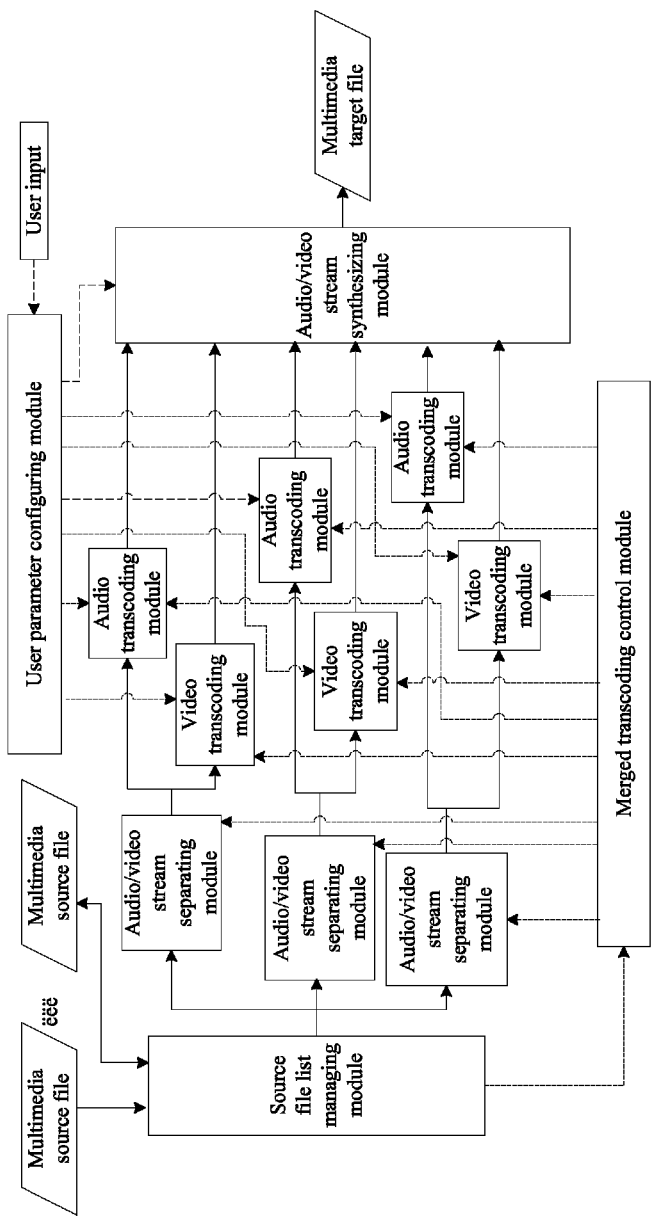
FIG. 4 is a schematic diagram illustrating a structure of another transcoder in accordance with the second embodiment of the present invention.

In order to further raise the transcoding efficiency, refer to FIG. 4, which is a schematic diagram illustrating a structure of another transcoder provided by the second embodiment of the present invention. The transcoder includes: a source file list managing module, multiple audio/video stream separating modules, multiple audio transcoding modules, multiple video transcoding modules, an audio/video stream synthesizing module, a merged transcoding control module and a user parameter configuring module. Based on the structure of the transcoder, when compared with above-mentioned blocks 201-209, the difference is as follows. In block 204, under the control the merged transcoding control module, the multiple source files in the source file list managing module may be respectively sent to their respective audio/video stream separating modules. The audio/video stream separating modules separate the source files simultaneously, and send audio streams and video streams obtained from the separation to their respective corresponding audio transcoding modules and video transcoding modules. The method is similar to that mentioned above, and no further descriptions will be provided here. Since the audio/video stream separation, audio transcoding and video transcoding may be performed on multiple source files simultaneously, the transcoding time is further saved, and the transcoding efficiency is increased.

Furthermore, the method provided by the embodiment of the present invention has no requirement on file format of source files. File formats of the source files may be the same or different. When file formats of the source files are different, the method provided by the embodiment of the present invention can provide the merged transcoding function mentioned in the embodiment of the present invention. When file formats of the source files are the same, and the user configures the target multimedia format (i.e. file format of the target file) as the file format of source files, the method provided by the embodiment of the present invention can provide a mergence function of multimedia files, that is, the transcoder provide by the embodiment of the present invention may serve as a merger for multimedia files.

Besides, the method provided by the embodiment of the present invention may be applied in the following occasions.

When a user shoots a video file of a scene and records an audio file of the scene at the same time, then a multimedia file with picture and sound may be obtained by utilizing the function for merging the video file and audio file of the method provided by the embodiment of the present invention. Thus, the user's usage experience is improved greatly.

Overall, the transcoding method provided by embodiments of the present invention, each of multiple source files to be transcoded selected by a user is separated into an audio stream and a video stream, and each audio stream and each video stream obtained from the separation is transcoded according to a transcoding target parameter inputted by the user. Thus, the transcoding operations on multiple source files may be performed at one time after the user selects the multiple multimedia source files, the transcoding operation is not needed to be started multiple times, transcoding times are decreased, and then the user experience may be improved. In addition, when merging transcoded audio stream and transcoded video stream, the transcoded audio stream and transcoded video stream may be merged into one multimedia target file, thus the user's need of continuously playing multiple multimedia files is satisfied, and the user experience may be further improved. Furthermore, by performing audio/video stream separation and transcoding on multiple source files to be transcoded simultaneously, the transcoding efficiency may be further increased.

The Third Embodiment

Figure 5:
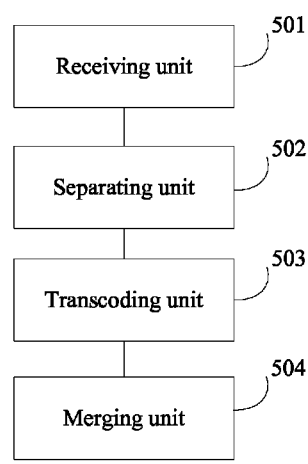
FIG. 5 is a schematic diagram illustrating a transcoding device in accordance with the third embodiment of the present invention.

When there are multimedia source files to be transcoded, in order to decrease transcoding times, enhance user experience, the embodiment of the present invention provide a transcoding device, refer to FIG. 5, the device includes:

A receiving unit 501, configured to receive multiple multimedia source files selected by a user and a transcoding target parameter inputted by the user;

A separating unit 502, configured to separate each of the multiple multimedia source files into an audio stream and a video stream;

A transcoding unit 503, configured to transcode each audio stream and each video stream separated by the separating unit 502 according to the transcoding target parameter received by the receiving unit 501; and A merging unit 504, configured to merge transcoded audio streams and transcoded video streams of the multiple multimedia source files obtained by the transcoding unit 503 into at least one multimedia target file.

Figure 6:
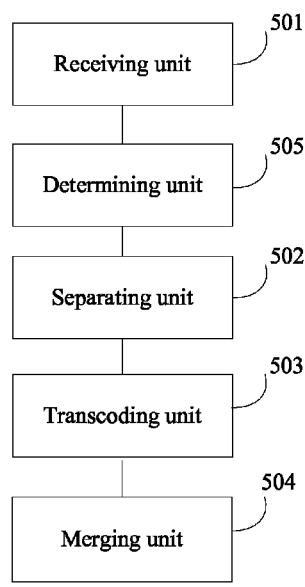
FIG. 6 is a schematic diagram illustrating another transcoding device in accordance with the third embodiment of the present invention.

Refer to FIG. 6, the transcoding device provided by the embodiment of the present invention further includes:

A determining unit 505, configured to determine whether the transcoding target parameter received by the receiving unit 501 is valid, and if the transcoding target parameter is valid, provide the transcoding target parameter to the transcoding unit 503.

When the determining unit 505 determines whether the transcoding target parameter is valid, the specific process may be as follows. Determining whether the transcoding target parameter satisfies a preset format parameter, if the transcoding target parameter satisfies the preset format parameter, the transcoding target parameter is valid; otherwise, the transcoding target parameter is invalid. The preset format parameter is not limited by the embodiment.

The separating unit 502 includes a first separating unit or a second separating unit.

The first separating unit is configured to separate each of the multiple multimedia source files into an audio stream and a video stream in turn.

The second separating unit is configured to separate each of the multiple multimedia source files into an audio stream and a video stream simultaneously.

Specifically, after receiving a transcoding confirmation signal inputted by the user, the first separating unit may separate each of the multiple multimedia source files into an audio stream and a video stream in turn in an order of creation time of the multiple multimedia source files; or the first separating unit may separate each of the multiple multimedia source files into an audio stream and a video stream in turn in an order of filenames of the multiple multimedia source files; or the first separating unit may separate each of the multiple multimedia source files into an audio stream and a video stream in turn according to a user-demanded arrangement sequence of merged transcoded files.

The transcoding unit 503 includes a first transcoding unit or a second transcoding unit.

The first transcoding unit is configured to transcode each audio stream and each video stream obtained from the separation one by one.

The second first transcoding unit is configured to transcode each audio stream and each video stream obtained from the separation simultaneously.

Specifically, the first transcoding unit may transcode each audio stream and each video stream obtained from the separation one by one in an order of creation time of the multiple multimedia source files; or the first transcoding unit may transcode each audio stream and each video stream obtained from the separation one by one in an order of filenames of the multiple multimedia source files; or the first transcoding unit may transcode each audio stream and each video stream obtained from the separation one by one according to a user-demanded arrangement sequence of merged transcoded files.

The transcoding target parameter includes but is not limited to a file format of a multimedia target file or a file size of the multimedia target file.

When there is one multimedia target file, file formats of multiple multimedia source files are the same or different.

Specifically, the merging unit 504 is configured to merge transcoded audio stream and transcoded video stream of each multimedia source file, and obtain a multimedia target file corresponding to the multimedia source file.

Furthermore, the merging unit 504 is further configured to merge obtained multiple multimedia target files corresponding to the multiple multimedia source files, and obtain one multimedia target file.

Alternatively, the merging unit 504 is configured to merge transcoded audio streams of all multimedia source files, and obtain a merged audio stream; merge transcoded video streams of all multimedia source files, and obtain a merged video stream; merge the merged audio stream and the merged video stream, and obtain one multimedia target file.

Figure 7:
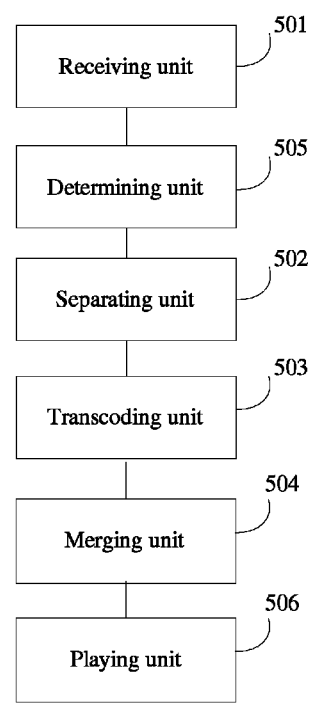
FIG. 7 is a schematic diagram illustrating yet another transcoding device in accordance with the third embodiment of the present invention.

Refer to FIG. 7, the transcoding device provided by the embodiment of the present invention may further includes a playing unit 506, configured to play the multimedia target file merged by the merging unit 504.

Corresponding to above-mentioned method embodiment, modules in the device provided by the embodiment of the present invention may be merged into one module, or be divided into multiple sub-modules furthermore, which is not limited by the embodiment. For example, the receiving unit 501 in the device provided by the embodiment of the present invention may be achieved by the source file list managing module and user parameter configuring module described in the method embodiment of the present invention. The separating unit 502 in the device provided by the embodiment of the present invention may be achieved by the audio/video stream separating module described in the method embodiment of the present invention. The transcoding unit 503 in the device provided by the embodiment of the present invention may be achieved by the audio transcoding unit and the video transcoding unit described in the method embodiment of the present invention. The merging unit 504 in the device provided by the embodiment of the present invention may be achieved by the audio/video stream synthesizing module described in the method embodiment of the present invention. There are may be at least one audio/video stream separating unit, and the audio transcoding module and the video transcoding module are similar.

In conclusion, the transcoding device provided by embodiments of the present invention, each of multiple source files to be transcoded selected by a user is separated into an audio stream and a video stream, and each audio stream and each video stream obtained from the separation is transcoded according to a transcoding target parameter inputted by the user. Thus, the transcoding operations on multiple source files may be performed at one time after the user selects the multiple multimedia source files, the transcoding operation is not needed to be started multiple times, transcoding times are decreased, and then the user experience may be improved. In addition, when merging transcoded audio stream and transcoded video stream, the transcoded audio stream and transcoded video stream may be merged into one multimedia target file, thus the user's need of continuously playing multiple multimedia files is satisfied, and the user experience may be further improved. Furthermore, by performing audio/video stream separation and transcoding on multiple source files to be transcoded simultaneously, the transcoding efficiency may be further increased.

The word "receiving" in the embodiment of the present invention may be understood as actively obtaining information from another module, or receiving information sent by another module.

Persons having ordinary skill in the art may easily learn that the accompanying drawings are only schematic diagrams of a preferred embodiment. The modules or processes illustrated in the accompanying drawings are not definitely necessary to implement the present invention.

Persons having ordinary skill in the art may understand that the modules in the device embodiment may be distributed in the device of the embodiment according to embodiment descriptions, or may change correspondingly to locate in one or more devices different from the embodiment. The modules in above embodiment may be merged into one module, or may be divided into multiple sub-modules furthermore.

Sequence number in above embodiments of the present invention is only used for descriptions, which doesn't demonstrate good or better embodiment.

Some blocks in the embodiments of the present invention may be implemented with software. Corresponding software programs may be stored in readable storage medium, such as Optical Disk (CD) or hard disk.

The foregoing description is only preferred embodiments of the present invention and is not used for limiting the protection scope thereof. Any modification, equivalent substitution, or improvement made without departing from the spirit and principle of the present invention should be covered by the protection scope of the present invention.

The invention claimed is:

1. A method for transcoding, comprising:
   receiving multiple multimedia source files selected by a user and a transcoding target parameter inputted by the user;
   separating each of the multiple multimedia source files into an audio stream and a video stream;
   according to the transcoding target parameter, transcoding each audio stream and each video stream both of which are obtained from the separation;
   merging transcoded audio streams and transcoded video streams of the multiple multimedia source files into at least one multimedia target file;
   wherein merging transcoded audio streams and transcoded video streams of the multiple multimedia source files into at least one multimedia target file comprises,
   merging transcoded audio streams of all multimedia source files, and obtaining a merged audio stream,
   merging transcoded video streams of all multimedia source files, and obtaining a merged video stream, and
   merging the merged audio stream and the merged video stream, and obtaining one multimedia target file.

2. The method according to claim 1, after receiving the transcoding target parameter inputted by the user, further comprising:
   determining whether the transcoding target parameter is valid, if the transcoding target parameter is valid, performing the process of according to the transcoding target parameter, transcoding each audio stream and each video stream both of which are obtained from the separation.

3. The method according to claim 2, wherein separating each of the multiple multimedia source files into an audio stream and a video stream comprises:
   separating each of the multiple multimedia source files into an audio stream and a video stream one by one; or
   separating each of the multiple multimedia source files into an audio stream and a video stream simultaneously;
   wherein transcoding each audio stream and each video stream both of which are obtained from the separation comprises:
   transcoding each audio stream and each video stream both of which are obtained from the separation one by one; or
   transcoding each audio stream and each video stream both of which are obtained from the separation simultaneously.

4. The method according to claim 3, wherein separating each of the multiple multimedia source files into an audio stream and a video stream one by one comprises:
   separating each of the multiple multimedia source files into an audio stream and a video stream one by one in an order of creation time or filenames of the multiple multimedia source files; or
   separating each of the multiple multimedia source files into an audio stream and a video stream one by one according to a user-demanded arrangement sequence of merged transcoded files;
   wherein transcoding each audio stream and each video stream both of which are obtained from the separation one by one comprises:
   transcoding each audio stream and each video stream both of which are obtained from the separation one by one in an order of creation time or filenames of the multiple multimedia source files; or
   transcoding each audio stream and each video stream both of which are obtained from the separation one by one according to a user-demanded arrangement sequence of merged transcoded files.

5. The method according to claim 1, the transcoding target parameter comprises:
   a file format of a multimedia target file or a file size of the multimedia target file.

6. A device for transcoding, comprising a processor coupled to a memory storing machine readable instructions for execution by the processor; wherein the machine readable instructions comprise:
   a receiving instruction, indicating to receive multiple multimedia source files selected by a user and a transcoding target parameter inputted by the user;
   a separating instruction, indicating to separate each of the multiple multimedia source files into an audio stream and a video stream;
   a transcoding instruction, indicating to transcode each audio stream and each video stream separated by the separating unit according to the transcoding target parameter received by the receiving unit; and
   a merging instruction, indicating to merge transcoded audio streams of all multimedia source files, and obtain a merged audio stream; merge transcoded video streams of all multimedia source files, and obtain a merged video stream; merge the merged audio stream and the merged video stream, and obtain one multimedia target file.

7. The device according to claim 6, wherein the machine readable instructions, further comprises:
   a determining instruction, indicating, to determine whether the transcoding target parameter received by the receiving unit is valid, and if the transcoding target parameter is valid, provide the transcoding target parameter to the transcoding unit.

8. The device according to claim 6, wherein the separating instruction comprises a first separating instruction or a second separating instruction;
   the first separating instruction indicates to separate each of the multiple multimedia source files into an audio stream and a video stream one by one;

the second separating instruction indicates to separate each of the multiple multimedia source files into an audio stream and a video stream simultaneously; and wherein the transcoding instruction comprises a first transcoding unit or a second transcoding instruction;

the first transcoding unit to transcode each audio stream and each video stream obtained from the separation one by one;

the second first transcoding instruction indicates to transcode each audio stream and each video stream obtained from the separation simultaneously.

9. The device according to claim 8, after receiving a transcoding confirmation signal inputted by the user, the first separating instruction indicates to separate each of the multiple multimedia source files into an audio stream and a video stream one by one in an order of creation time or filenames of the multiple multimedia source files; or the first separating instruction indicates to separate each of the multiple multimedia source files into an audio stream and a video stream one by one according to a user-demanded arrangement sequence of merged transcoded files;

the first transcoding instruction indicates to transcode each audio stream and each video stream obtained from the separation one by one in an order of creation time or filenames of the multiple multimedia source files; or the first transcoding instruction indicates to transcode each audio stream and each video stream obtained from the separation one by one according to a user-demanded arrangement sequence of merged transcoded files.

* * * * *